(12) United States Patent
Walther et al.

(10) Patent No.: US 11,985,991 B2
(45) Date of Patent: May 21, 2024

(54) EXTRUDED PROTEIN PRODUCT AND METHODS OF MAKING

(71) Applicant: General Mills, Inc., Minneapolis, MN (US)

(72) Inventors: Goeran Walther, Plymouth, MN (US); Steven C Robie, Plymouth, MN (US); Kevin H Wright, Crystal, MN (US); Joel R Lafavor, Minnetonka, MN (US)

(73) Assignee: General Mills, Inc., Minneapolis, MN (US)

( * ) Notice: Subject to any disclaimer, the term of this patent is extended or adjusted under 35 U.S.C. 154(b) by 1001 days.

(21) Appl. No.: 16/803,453

(22) Filed: Feb. 27, 2020

(65) Prior Publication Data

US 2020/0196630 A1 Jun. 25, 2020

Related U.S. Application Data

(62) Division of application No. 14/599,763, filed on Jan. 19, 2015, now abandoned.

(51) Int. Cl.
| | |
|---|---|
| *A23J 3/26* | (2006.01) |
| *A23J 3/16* | (2006.01) |
| *A23L 33/185* | (2016.01) |
| *A23P 20/10* | (2016.01) |
| *A23P 30/20* | (2016.01) |

(52) U.S. Cl.
CPC . *A23J 3/26* (2013.01); *A23J 3/16* (2013.01); *A23L 33/185* (2016.08); *A23P 20/10* (2016.08); *A23P 20/105* (2016.08); *A23P 20/11* (2016.08); *A23P 30/20* (2016.08)

(58) Field of Classification Search
CPC .......... A23L 7/117; A23L 7/122; A23L 7/191; A23P 20/10; A23J 3/26
See application file for complete search history.

(56) References Cited

U.S. PATENT DOCUMENTS

| | | |
|---|---|---|
| 3,102,031 A | 8/1963 | MacAllister |
| 3,537,859 A | 11/1970 | Hamdy |
| 3,863,019 A | 1/1975 | Strommer |
| 3,925,566 A | 12/1975 | Reinhart et al. |
| 4,338,339 A | 7/1982 | Edwards |
| 4,568,550 A | 2/1986 | Fulger et al. |

(Continued)

FOREIGN PATENT DOCUMENTS

| | | |
|---|---|---|
| CN | 1045913 | 10/1990 |
| CN | 1393169 | 1/2003 |

(Continued)

OTHER PUBLICATIONS

Ilo et al., "*Role of Lipids in the Extrusion Cooking Processes*", Grsas y Aceites, vol. 51, Fasc. 1-2, pp. 97-110, 2000.

*Primary Examiner* — Elizabeth Gwartney
(74) *Attorney, Agent, or Firm* — Diedriks & Whitelaw, PLC; Rachel A. Kahler

(57) ABSTRACT

The present disclosure relates to extruded protein products and methods for producing an extruded protein product. In particular, an extruded piece is disclosed having a high protein content and having a desirable texture and flavor. Methods for making an extruded piece include processing, under extrusion conditions, a combination of a powdered protein ingredient, a protein matrix disruptive ingredient, water, and an oil.

15 Claims, 5 Drawing Sheets

(56) References Cited

U.S. PATENT DOCUMENTS

| | | |
|---|---|---|
| 4,579,749 A | 4/1986 | Ishizuka et al. |
| 4,627,985 A | 12/1986 | Yada et al. |
| 4,978,544 A | 12/1990 | Sexton |
| 5,071,668 A | 12/1991 | Van Lengerich et al. |
| 5,464,644 A | 11/1995 | Wullschleger |
| 5,665,419 A | 9/1997 | Teraguchi et al. |
| 7,419,695 B1 | 9/2008 | Taillie et al. |
| 8,158,179 B2 | 4/2012 | Bouvier et al. |
| 8,293,317 B2 | 10/2012 | Fannon |
| 8,685,485 B2 | 4/2014 | McMindes et al. |
| 8,778,442 B2 | 7/2014 | Khan et al. |
| 9,314,045 B2 | 4/2016 | Nishimura et al. |
| 2003/0064145 A1 | 4/2003 | Fannon |
| 2006/0073261 A1 | 4/2006 | McMindes et al. |
| 2006/0141125 A1 | 6/2006 | Gifford |
| 2008/0050476 A1* | 2/2008 | Holdridge ............ A23L 7/13 426/291 |
| 2008/0102165 A1 | 5/2008 | Ning et al. |
| 2008/0248167 A1 | 10/2008 | McMindes et al. |
| 2009/0155447 A1 | 6/2009 | Moore et al. |
| 2011/0290122 A1 | 12/2011 | Asencio et al. |
| 2012/0093994 A1 | 4/2012 | Hsieh et al. |
| 2012/0269939 A1 | 10/2012 | Hahn |
| 2013/0251877 A1 | 9/2013 | Levin et al. |
| 2014/0037812 A1 | 2/2014 | Oxboll et al. |
| 2016/0205985 A1 | 7/2016 | Walther et al. |
| 2016/0205986 A1 | 7/2016 | Walther et al. |

FOREIGN PATENT DOCUMENTS

| | | |
|---|---|---|
| EP | 262276 | 4/1988 |
| WO | WO 1995/016368 | 6/1995 |
| WO | WO 2003/000063 | 1/2003 |
| WO | WO 2011/011456 | 1/2011 |
| WO | WO 2013/192284 | 12/2013 |
| WO | WO 2016/150834 | 9/2016 |

* cited by examiner

EXTRUDED PROTEIN PRODUCT AND METHODS OF MAKING

CROSS REFERENCE TO RELATED APPLICATIONS

The present application represents a divisional application of U.S. patent application Ser. No. 14/599,763 entitled "Extruded Protein Product and Methods of Making" filed Jan. 19, 2015, pending. The entire content of which is incorporated herein by reference.

TECHNOLOGY

The present disclosure generally relates to an extruded protein product and methods of making such a product.

BACKGROUND

High protein food products have found popularity among consumers as a way to eat nutritionally dense foods. Consumers want diverse ways to get increased protein into their diets. Thus, there is a need for new high protein food products to satisfy the increasing consumer desire for protein.

SUMMARY

Provided herein is a composition including extruded pieces. The extruded pieces include protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusions in an amount of from 0% to about 50% by weight.

The extruded pieces can have a substantially non-linearly oriented protein matrix.

In some embodiments, the extruded pieces can have a texture analysis measurement of from about 1000 g to about 7400 g force and/or a density of from about 0.5 g/cc to about 1.0 g/cc.

The extruded pieces can have a rough and/or uneven surface.

The protein can include one or a combination of soy protein, whey protein, bean protein, pea protein, wheat protein, canola protein, or algae protein.

In some embodiments, the protein matrix disruptive ingredient can be a flour or a syrup. In some embodiments, the protein matrix disruptive ingredient can include a starch, a sugar, or a fiber.

In some embodiments, the inclusions can be one or a combination of nuts, seeds, fruit, grains, or coconut. In some embodiments, the extruded pieces can have inclusions substantially uniformly distributed throughout the extruded pieces.

The oil can be substantially uniformly distributed throughout the extruded pieces.

In some embodiments, the extruded pieces can have a sugar-based coating, a fat-based coating, or a protein-based coating.

In some embodiments, an extruded piece can be adhered with one or more edible component to form a cluster. In some embodiments, an extruded piece can be adhered to one or more additional extruded piece to form a cluster.

A food product is also provided herein. A food product includes food product pieces and extruded pieces having protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusions in an amount of from 0% to about 50% by weight.

A composition is provided herein including particulates derived from extruded pieces, where the extruded have protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusions in an amount of from 0% to about 50% by weight. The particulates can be coated on a food product or formed into a food product.

A food product or kit is provided herein. The food product or kit includes a first food component and a second food component, where the first food component includes extruded pieces having protein in an amount of about 30% to about 90% by weight, a protein matrix disruptive ingredient in an amount of from about 5% to about 50% by weight, oil in an amount of from about 2% to about 20% by weight, water in an amount of from about 1.5% to about 8% by weight, and inclusions in an amount of from 0% to about 50% by weight.

A method of making a food product is also provided herein. The method includes processing, under extrusion conditions, a powdered protein ingredient comprising at least 45% protein by weight of the powdered protein ingredient and a protein matrix disruptive ingredient combined with water and an oil to form a protein matrix composition having a protein content of from about 10% to about 65% by weight, a moisture content of from about 25% to about 55% by weight and an oil content of from about 1% to about 15% by weight, and forming the protein matrix composition into pieces to form the food product.

The extrusion conditions can include a specific mechanical energy (SME) of from about 8 Wh/kg to about 100 Wh/kg, a die pressure of from about 150 PSI to about 1000 PSI, and/or a die temperature of from about 200° F. to about 350° F.

In some embodiments, the powdered protein ingredient includes at least a portion of the protein matrix disruptive ingredient.

In some embodiments, the protein matrix disruptive ingredient can be a flour or a syrup. In some embodiments, the protein matrix disruptive ingredient can include a starch, a sugar, or a fiber.

In some embodiments, the pieces can have a substantially non-linearly oriented protein matrix.

The method can further include drying the protein matrix composition pieces to a moisture content of from about 1.5% to about 8% by weight to form extruded pieces. In some embodiments, extruded pieces have a texture analysis measurement of from about 1000 g to about 7400 g force, and/or a density of from about 0.5 g/cc to about 1.0 g/cc. In some embodiments, the oil is substantially uniformly distributed throughout the pieces.

In some embodiments, the method can further include applying a sugar-based or protein-based coating to the extruded pieces to form coated pieces and drying the coated pieces.

In some embodiments, the method can further include applying a fat-based coating to the extruded pieces to form coated pieces and cooling the coated pieces.

In some embodiments, the method can further include comminuting the extruded pieces to form particulates. The method can further include producing a food product including the particulates and/or coating a food product with the particulates.

In some embodiments, the method can further include processing inclusions with the powdered protein ingredient, protein matrix disruptive ingredient, water, and oil. The inclusions can include one or a combination of nuts, seeds, fruit, grains, or coconut.

These and various other features and advantages will be apparent from a reading of the following detailed description.

DETAILED DESCRIPTION

Extrusion technology has begun to produce protein products that have an enjoyable texture, while reducing or eliminating the use of animal protein. Many of these products are designed to mimic whole or ground meat and are meant to be eaten in place of meat. However, consumers expect an even greater variety of high protein foods that are suitable for different eating occasions. As described herein, a new protein product has been produced having a high protein content and having an enjoyable texture and flavor that is suitable for a wide variety of eating occasions.

A protein product provided herein can be a composition comprising extruded pieces. Extruded pieces described herein comprise protein, a protein matrix disruptive ingredient, oil, and water. In some embodiments, extruded pieces provided herein include inclusions.

Extruded pieces provided herein comprise protein in an amount of about 30% to about 90% (e.g., about 50% to about 75%) by weight protein. The amount and type of protein included in extruded pieces described herein can be selected to produce a protein matrix when extruded in the presence of water and an oil.

Figure 1E:
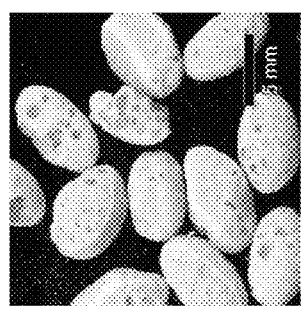
FIG. 1 includes macroscopic images of the surfaces of an extruded piece according to one embodiment (FIG. 1A), a piece that does not include oil (FIG. 1B), two commercially available textured vegetable protein products (FIGS. 1C and 1D), and two commercially available puffed soy protein crisps (FIGS. 1E and 1F).
Figure 1F:
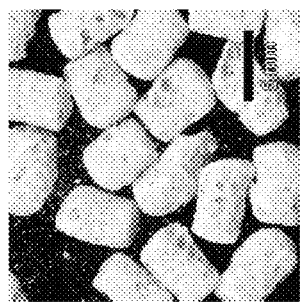
Figure 1C:
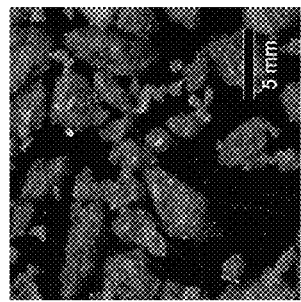
Figure 1D:
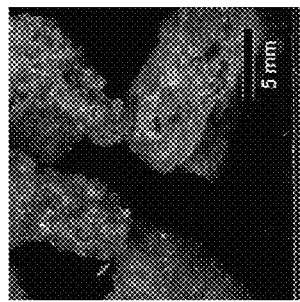
Figure 1A:
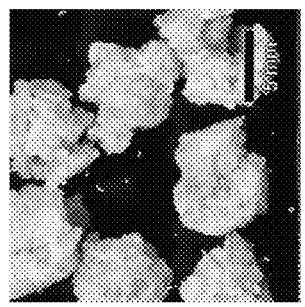
Figure 1B:
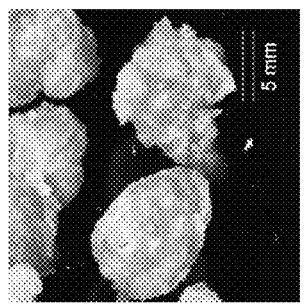
Figure 2A:
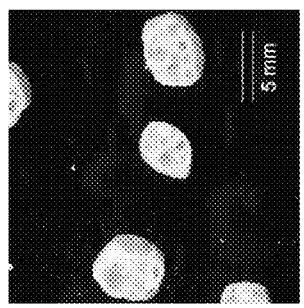
FIG. 2 includes macroscopic images of cross sections of an extruded piece according to one embodiment (FIG. 2A), a piece that does not include oil (FIG. 2B), two commercially available textured vegetable protein products (FIGS. 2C and 2D), and two commercially available puffed soy protein crisps (FIGS. 2E and 2F).
Figure 2C:
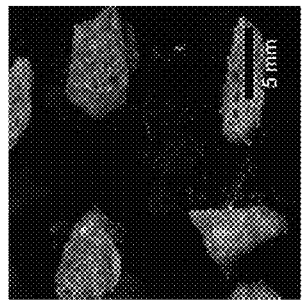
Figure 2E:
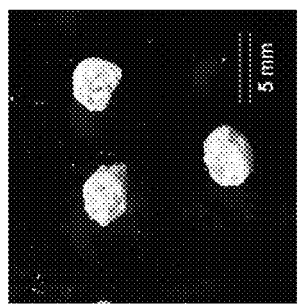
Figure 2B:
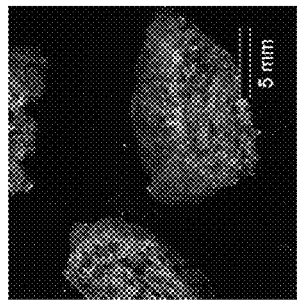
Figure 2D:
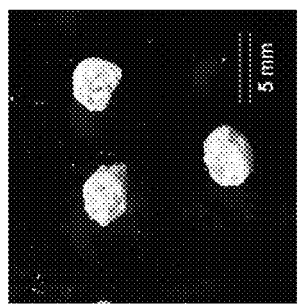
Figure 2F:
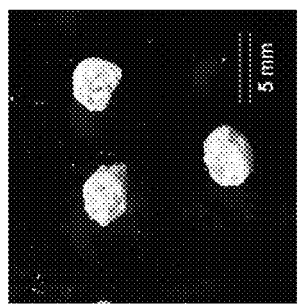
Figure 3A:
FIG. 3 includes light micrographs of an extruded piece according to one embodiment (FIG. 3A), a piece that does not include oil (FIG. 3B), two commercially available textured vegetable protein products (FIGS. 3C and 3D), and two commercially available puffed soy protein crisps (FIGS. 3E and 3F).
Figure 3B:
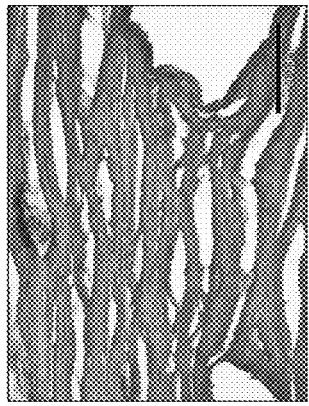
Figure 3C:
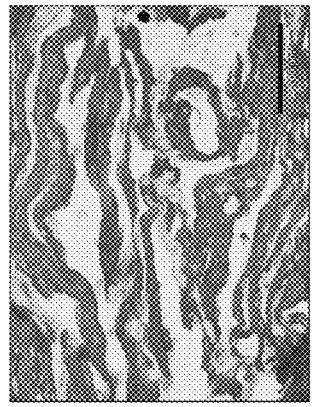
Figure 3D:
Figure 4A:
FIG. 4 includes confocal micrographs of an extruded piece according to one embodiment (FIG. 4A), a piece that does not include oil (FIG. 4B), two commercially available textured vegetable protein products (FIGS. 4C and 4D), and two commercially available puffed soy protein crisps (FIGS. 4E and 4F).
Figure 4B:
Figure 4C:
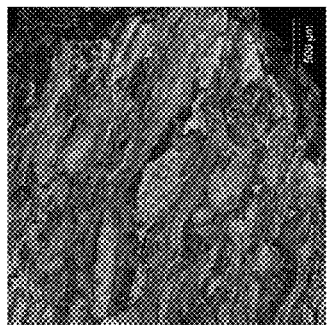
Figure 4D:
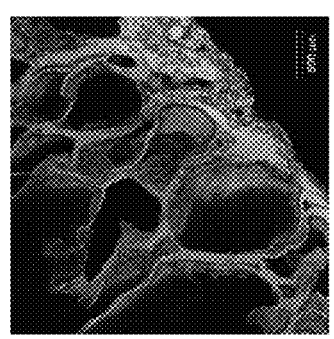
Figure 4E:
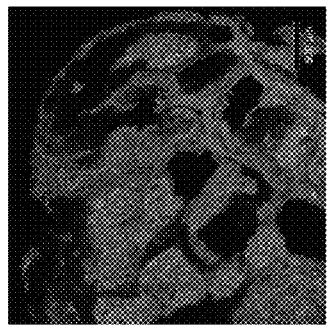
Figure 4F:

As illustrated in FIGS. 3A and 4A, an extruded piece provided herein can have a protein matrix that is substantially non-linearly oriented. This is in contrast to an extruded product having a substantially linearly oriented protein matrix, such as an extruded piece that does not contain oil, as illustrated in FIGS. 3B and 4B, or a known textured vegetable protein product, as illustrated in FIGS. 3C, 3D, 4C, and 4D. Without being bound to theory, it is believed that a substantially non-linearly oriented protein matrix can contribute to a desired texture of an extruded piece provided herein.

Protein suitable for use in an extruded piece includes plant-based protein (e.g., soy protein, pea protein, wheat protein, oat protein, bean protein, canola protein, lentil protein, and the like), microbe-based protein (e.g., algae protein, bacterial protein, and the like), fungal protein (e.g., yeast protein, mushroom protein, and the like), and animal-based protein (e.g., dairy protein, egg protein, insect protein, and the like). In some embodiments, a protein can be selected to produce a desired characteristic. For example, soy, pea, or bean protein, or the like, can be selected to exclude grain-based ingredients, or whey protein can be selected to produce extruded pieces having a crunchier texture. Other characteristics can include, for example, GMO-free, gluten-free, soy-free, and/or allergen free. In some embodiments, blends of proteins can be used in extruded pieces provided herein.

Extruded pieces also comprise a protein matrix disruptive ingredient in an amount of from about 5% to about 50% (e.g., about 15% to about 40%) by weight. As used herein, the term "protein matrix disruptive ingredient" refers to one or a combination of a flour (e.g., a grain flour, a legume flour, a vegetable or fruit powder, cocoa, or the like), a starch (e.g., tapioca starch, corn starch, a modified starch, a pregelatinized starch, or the like), a sugar (e.g., sucrose, fructose, lactose, or the like), a fiber (e.g., sugar cane fiber, inulin, oat fiber, pea fiber, bran, hull fiber, or the like), a polyol (e.g., glycerol or the like), syrups (e.g., corn syrup, tapioca syrup, honey, or the like), or the like. Without being bound by theory, it is believed that a protein matrix disruptive ingredient disrupts the protein matrix in an extruded piece provided herein to contribute to a desired texture and/or protein matrix structure of the extruded piece.

A protein matrix disruptive ingredient can be selected, for example, in order to provide a desired nutritional profile, flavor, sweetness, and/or texture to an extruded piece that contains the protein matrix disruptive ingredient. For example, oat hull fiber can be selected to produce extruded pieces having a desired fiber content, or a syrup can be selected to adjust texture and/or taste. In some embodiments, a protein matrix disruptive ingredient can be selected to provide a desired characteristic for an extruded piece, such as being grain-free, gluten-free, GMO-free, soy-free, and the like. For example, tapioca flour or starch can be selected to produce a grain-free extruded piece.

Extruded pieces provided herein include oil in an amount of from about 2% to about 20% (e.g., about 2% to about 15%) by weight. Oil in an extruded piece provided herein can be distributed substantially uniformly throughout the piece. This is in contrast to known textured vegetable protein products, which generally are made from defatted or low fat ingredients and do not contain oil or only residual amounts of oil (e.g., less than 2% by weight), or if oil is present, it is found mainly near the surface as a surface treatment of the textured vegetable protein. For example, oil spraying is commonly used to topically apply seasoning or flavor to textured vegetable protein products. The disclosed extruded pieces also contrast to puffed protein products currently available (e.g., soy crisps), which generally contain substantially no oil in the matrix.

Any edible oil is suitable for use in an extruded piece provided herein. Preferably, an oil included in an extruded piece is liquid at room temperature. Suitable oils include, without limitation, canola oil, olive oil, soy oil, sunflower oil, corn oil, and the like. An oil to be included in an extruded piece can be selected based on, for example, nutritional profile, compatibility with extrusion process and/or equipment, texture and/or mouthfeel imparted to the extruded piece, and/or price.

Extruded pieces described herein include water in an amount of from about 1.5% to about 8% (e.g., about 1.5% to about 6%) by weight. The amount of water in an extruded piece is generally selected in order to provide shelf stability and/or a desired texture to the extruded piece. A lower water content can be selected to increase shelf life of an extruded piece. In some embodiments, a higher water content can be selected in order to reduce the hardness of an extruded piece. Water content can also be selected to maintain solubility of one or more ingredients, such as an antioxidant, in an extruded piece.

In some embodiments, extruded pieces provided herein include inclusions up to about 50% by weight. As used herein, the term "inclusion" refers to a substantially solid edible particle. An inclusion is visually (i.e., macroscopically) distinguishable from the protein matrix of an extruded piece. Inclusions, when included in an extruded piece, are substantially uniformly distributed throughout the piece. Examples of inclusions include, without limitation, nut pieces, whole grain pieces, seeds and/or seed pieces, fruit pieces, coconut, confection pieces, and the like.

Additional ingredients can be included in extruded pieces provided herein. An additional ingredient can be selected to impart a desired nutritional profile, flavor, sweetness, texture, shelf life, and/or visual appearance to an extruded piece, or to provide an advantage to the production process of an extruded piece. Examples of additional ingredients that can be included in an extruded piece include, without limitation, flavorants, nutritive and/or non-nutritive sweeteners, salts, colorants, antioxidants, vitamins, and/or minerals, and the like.

Extruded pieces provided herein can have a texture analysis measurement of from about 1000 g to about 7400 g (e.g., from about 1000 g to about 5600 g) force. As used herein, the term "texture analysis measurement" refers to an average 50% strain force of 10 replicate measurements in g obtained from the following protocol: a single piece is placed on the stage of a TA.HDPlus Texture Analyzer (Texture Technologies, Massachusetts, USA) and subjected to a 50% strain test at a speed of 2 mm/second using a 50 kg load cell and a 1 inch cylindrical stainless steel probe.

In some embodiments, extruded pieces can have a density of from about 0.5 g/cc to about 1.0 g/cc (e.g., from about 0.7 g/cc to about 1.0 g/cc, or about 0.8 g/cc to about 0.9 g/cc). As used herein, density is measured by the displacement of granular sodium chloride. About 150 cc of sodium chloride is placed in a 250 ml graduated cylinder and tapped in a tap density analyzer 300×. The volume of salt is recorded to the nearest cc. The salt is then removed from the cylinder. The salt is poured back into the cylinder in about 10-20 cc aliquots alternating with pieces of a known weight of extruded pieces until the volume is approximately 150 cc. The remaining salt is then placed in the cylinder. The cylinder is again tapped 300× in the tap density analyzer. The volume is recorded and the particle density of each sample is calculated as the weight of the sample divided by the difference in tapped volume with and without sample present.

In some embodiments, extruded pieces provided herein can have a rough or uneven surface. A rough surface can provide a visually interesting appearance to extruded pieces. In some embodiments, inclusions can contribute to a rough or uneven surface of an extruded piece.

In some embodiments, extruded pieces can have average diameter of from about 2 mm to about 15 mm (e.g., from about 5 mm to about 10 mm). The size of an extruded piece can be adjusted for the desired use of the extruded piece or to provide a manufacturing advantage. For example, the size of an extruded piece can be adjusted to provide a desired size for eating as a stand-alone snack. In another example, the size of an extruded piece can be adjusted to result in a desired drying time during manufacturing. Piece size can be adjusted using known methods, such as die size selection, rate of extrusion, and/or cutter speed.

Extruded pieces can be produced by processing, under extrusion conditions, a powdered protein ingredient and a protein matrix disruptive ingredient with sufficient water and an oil to form a protein matrix composition. As used herein, the term "extrusion conditions" refers to subjecting components to heat, pressure, and shear in an extruder. Extrusion conditions can include applying sufficient specific mechanical energy (SME) (e.g., at least about 8 Wh/kg, or from about 10 Wh/kg to about 100 Wh/kg, about 10 Wh/kg to about 50 Wh/kg, or from about 15 Wh/kg to about 35 Wh/kg) to produce extruded pieces having a desired protein matrix. In some embodiments, extrusion conditions can comprise a die temperature of at least 200° F. (e.g., from about 200° F. to about 350° F., or from about 250° F. to about 300° F.). As used herein, the term "die temperature" refers to the temperature of a protein matrix composition inside the die of an extruder just before exiting the die. In some embodiments, extrusion conditions can comprise a die pressure of at least about 150 PSI (e.g., from about 150 PSI to about 1000 PSI, about 200 PSI to about 600 PSI, or from about 250 PSI to about 350 PSI). As used herein, the term "die pressure" refers to the pressure a protein matrix composition is exposed to inside the die of an extruder just before exiting the die.

A powdered protein ingredient, as used herein, is an edible dry ingredient comprising at least 45% protein (e.g., at least 50%, at least 70%, or at least 90%) by weight. Examples of powdered protein ingredients include, without limitation, flours having a protein content of at least 45% (e.g., defatted soy flour), protein concentrates (e.g., soy protein concentrate, pea protein concentrate, whey protein concentrate, and the like), protein isolates (e.g., soy protein isolate, pea protein isolate, whey protein isolate, and the like), pure proteins, and combinations thereof. A powdered protein ingredient can be included in an amount sufficient to produce a protein matrix composition having a protein content of about 10% to about 65% (e.g., about 15% to about 50%) protein by weight of the protein matrix composition.

In some embodiments, a powdered protein ingredient can comprise a protein matrix disruptive ingredient. For example, a protein concentrate or a protein isolate can include, for example, starch, sugar, fiber, and/or inorganic components, and the like. In some embodiments, all or part of the protein matrix disruptive ingredient can be combined with powdered protein ingredient, water, and oil as a separate ingredient.

Water and oil are combined with the powdered protein ingredient, protein matrix disruptive ingredient, and optional inclusions and/or other ingredients in amounts sufficient to form a protein matrix composition having a moisture content of from about 25% to about 55% by weight and an oil content of from about 1% to about 15% by weight. Water can be provided in any appropriate form. For example, tap or filtered water, fruit or vegetable juice, or the like, can be used to provide the desired moisture content. In some embodiments, water and oil can be provided as an emulsion for combination with the powdered protein ingredient, protein matrix disruptive ingredient, and optional inclusions and/or other ingredients.

It has been discovered that incorporating oil into a protein matrix composition results in extruded pieces that have a desirable texture and a substantially non-linear protein matrix, while the addition of too much oil (e.g., more than 15% by weight) results in incomplete incorporation of the oil. It has also been discovered that too little water addition (i.e., less than about 25% by weight) can result in oil being squeezed from the protein matrix composition, which alters the texture of extruded pieces and/or interferes with the proper function of extruder equipment. However, it has also been discovered that the addition of too much water (i.e., more than 55% by weight) can result in extruded pieces that are harder than desired. It has further been discovered that incorporation of water and oil into a protein matrix composition allows for the incorporation of inclusions that are visually distinguishable from protein matrix rather than being crushed or degenerated during extrusion at low water and/or low or no oil conditions such that inclusions remain visually indistinguishable.

The amounts of oil and/or water combined with a powdered protein ingredient and protein matrix disruptive ingredient can be adjusted in order to result in a desired appearance and/or texture of extruded pieces. As the amount of oil is increased, extruded pieces generally appear rougher and have a crunchier texture. As the amount of water is increased, extruded pieces generally appear smoother and have a harder texture.

The amounts of oil and/or water combined with a powdered protein ingredient and protein matrix disruptive ingredient can also be adjusted in order to adjust the amount of shear a protein matrix composition is subjected to. Generally, higher amounts of water and/or oil reduce the amount of shear that a protein matrix composition is subjected to. In some embodiments, higher water and/or oil can be used to make extruded pieces with relatively large inclusions.

In some embodiments, dry ingredients, such as a powdered protein ingredient, a protein matrix disruptive ingredient, inclusions and/or other optional components, can be combined prior to combining with water and/or oil under extrusion conditions. In some embodiments, components can be added stepwise or at essentially the same time before combining under extrusion conditions.

Extruders suitable for use in the methods provided herein can include, for example, a single screw, twin, or triple screw extruder, or a ring extruder. For example a co-rotating, intermeshing, twin screw extruder can be used in a method provided herein. Manufacturers for co-rotating twin screw extruders include, for example, Coperion, Wenger, Clextral, Bersttorf, APV, Buhler, and Leistritz. Manufacturers for single screw extruders include, for example, Wenger, APV, and Buhler.

A protein matrix composition can be formed into pieces using any suitable method to form protein matrix composition pieces. For example, a protein matrix composition can passed through an extrusion die and then cut in order to form pieces.

Following formation, protein matrix composition pieces are dried to form extruded pieces using any appropriate method to reach a moisture content of from about 1.5% to about 8% to form extrude pieces. For example, protein matrix composition pieces can be subjected to heated air in order to dry them to the desired moisture content.

In some embodiments, extruded pieces provided herein can be packaged and sold as a food product without any other components. Such packaged extruded pieces can be intended to be eaten as a food product alone or in combination with other food products. For example, extruded pieces can be packaged and sold as a stand alone snack or can be used as a topping for yogurt or oatmeal. Extruded pieces provided herein have a texture suitable such that they need not be further prepared for eating by, for example, heating or soaking. However, it is to be understood that an individual may enjoy heating and/or soaking extruded pieces provided herein during various eating occasions, such as when combined with oatmeal.

In some embodiments, extruded pieces provided herein can be combined with other food components to produce a food product. For example, extruded pieces can be combined with food product pieces, such as ready to eat (RTE) cereal pieces or popcorn, to produce a food product having desired protein content. In another example, extruded pieces can be combined with dried fruit and/or nuts to produce a snack mix type product or a granola type product.

In some embodiments, extruded pieces provided herein can be packaged into a kit with other food products. For example, extruded pieces can be combined as a kit with yogurt, which can be combined prior to eating.

In some embodiments, an extruded piece can be adhered with one or more edible component, such as another extruded piece, nut pieces, fresh or dried fruit pieces, seeds, coconut, grain, and the like, to form a cluster. An extruded piece and one or more edible component can be adhered to each other using any appropriate method and ingredients (e.g., edible binders and the like). For example, a cluster can be produced using a combination of an extruded piece and rolled oats adhered using a honey-based binder or slurry. Clusters can be provided as a food product alone or as part of a food product, such as a snack mix, ready to eat cereal, or oatmeal mix.

In some embodiments, extruded pieces provided herein can be comminuted into particulates (i.e., having an average diameter of less than 2 mm) to produce a composition derived from extruded pieces that resembles crumbs or a powder. Such particulates can be used, for example, to coat food products, such as ready to eat cereal pieces, snack food pieces, and the like. In some embodiments, particulates derived from extruded pieces provided herein can be combined with other components and formed into a food product, such as ready to eat cereal pieces, snack food pieces, baked goods, and the like. In some embodiments, particulates derived from extruded pieces disclosed herein can be used in addition to, or to partially or completely replace, protein ingredients, such as soy protein concentrate, in other food products where a high protein content is desired.

It is to be understood that extruded pieces provided herein can be used for either sweet or savory applications. Extruded pieces disclosed herein can provide a benefit of being a high protein stand-alone food product or provide added protein in combination with other components in food products while also providing an improved flavor and/or texture over other known high protein pieces, such as textured vegetable protein or puffed protein crisps.

EXAMPLES

Example 1

Formulations including soy protein isolate (SPI), flour (F), sugar (S), oil (O), water (W), and flavor (R) according to Table 1 (SPI, F, S, and R are shown as % weight of dry ingredients and O and W are shown as % weight of protein matrix composition) were combined in a Buhler BCTL-42 extruder (Buhler Inc., Minnesota, USA) to form a protein matrix composition. The protein matrix composition was extruded through a single hole die having a diameter of 1.59 mm and cut to form protein matrix composition pieces approximately 5 mm to 10 mm. The pieces were dried using tray dryer to a moisture content of about 1.5% to about 8% to form extruded pieces.

TABLE 1

| Sample | SPI | F | S | O | W | R | SME (Wh/kg) | Die temp. (° F.) | Die press. (PSI) |
|---|---|---|---|---|---|---|---|---|---|
| 1 | 75 | 20 | 4 | 5.4 | 59.8 | 0.6 | 9.6 | 248 | 152 |
| 2 | 75 | 20 | 4 | 6.5 | 50.4 | 0.6 | 15.4 | 253 | 199 |
| 3 | 75 | 20 | 4 | 7.8 | 40.4 | 0.6 | 24.6 | 265 | 297 |
| 4 | 75 | 20 | 4 | 9.0 | 30.7 | 0.6 | 27.9 | 274 | 330 |
| 5 | 75 | 20 | 4 | 0 | 33.7 | 0.6 | 82.6 | 313 | 810 |
| 6 | 75 | 20 | 4 | 3.5 | 56.6 | 0.6 | 14.9 | 257 | 193 |
| 7 | 75 | 20 | 4 | 4.4 | 46.7 | 0.6 | 17.1 | 262 | 273 |
| 8 | 75 | 20 | 4 | 5.2 | 36.6 | 0.6 | 24.5 | 275 | 411 |
| 9 | 75 | 20 | 4 | 1.8 | 37.9 | 0.6 | 32.1 | 284 | 506 |
| 10 | 75 | 20 | 4 | 1.5 | 48.2 | 0.6 | 20.0 | 275 | 320 |
| 11 | 75 | 20 | 4 | 1.2 | 58.0 | 0.6 | 14.5 | 259 | 213 |
| 12 | 65 | 30 | 4 | 6.5 | 50.1 | 0.6 | 12.6 | 256 | 194 |
| 13 | 65 | 30 | 4 | 7.8 | 40.3 | 0.6 | 18.3 | 263 | 294 |
| 14 | 65 | 30 | 4 | 9.0 | 30.7 | 0.6 | 19.9 | 274 | 305 |
| 15 | 65 | 30 | 4 | 5.9 | 27.6 | 0.6 | 23.9 | 282 | 377 |
| 16 | 65 | 30 | 4 | 5.6 | 31.8 | 0.6 | 23.1 | 282 | 412 |
| 17 | 65 | 30 | 4 | 4.8 | 41.7 | 0.6 | 19.9 | 272 | 337 |
| 18 | 65 | 30 | 4 | 1.6 | 43.0 | 0.6 | 25.1 | 275 | 370 |
| 19 | 65 | 30 | 4 | 1.9 | 33.1 | 0.6 | 46.2 | 288 | 547 |
| 20 | 65 | 30 | 4 | 2.1 | 2 | 0.6 | 47.8 | 291 | 571 |

Formulations were attempted using 25% moisture or less, but oil separated during extrusion.

Extruded pieces were eaten to determine acceptability of texture for consumption without further preparation (Table 2). Extruded pieces produced using a protein matrix composition having 55% moisture or greater were identified as having an unacceptable hardness when consumed. In addition, extruded pieces produced using a protein matrix composition having 55% moisture or greater exhibited a smooth, even surface. Extruded pieces produced using a protein matrix composition having no added oil resembled TVP and were relatively hard.

The protein content in extruded pieces from each of the samples was measured (as % weight) using the Dumas method. Overall fat content (as % weight) was measured by gas chromatography. Moisture content of extruded pieces was also measured by subjecting the extruded pieces to a vacuum oven at 70° C. for 16 hours. Protein, fat, and moisture content are shown in Table 2.

TABLE 2

| Sample | Measured protein (% wt) | Measured fat (% wt) | Moisture (% wt) | Acceptable texture for consumption |
|---|---|---|---|---|
| 1 | 58.5 | 13.2 | 6.7 | No |
| 2 | 61.4 | 13.9 | 2.3 | Yes |
| 3 | 61.9 | 13.4 | 1.9 | Yes |
| 4 | 61.6 | 12.3 | 2.9 | Yes |
| 5 | 65.7 | 1.9 | 7.8 | No (TVP-like) |
| 6 | 63.6 | 10.7 | 3.7 | No |
| 7 | 63.6 | 9.5 | 4.0 | Yes |
| 8 | 63.4 | 10.6 | 4.2 | Yes |
| 9 | 67.9 | 6.3 | 2.3 | Yes |
| 10 | 67.4 | 4.9 | 2.9 | Yes |
| 11 | 67.4 | 5.0 | 3.8 | No |
| 12 | 55.7 | 14.6 | 2.1 | Yes |
| 13 | 54.7 | 13.1 | 4.0 | Yes |
| 14 | 53.8 | 12.1 | 4.0 | Yes |
| 15 | 56.3 | 9.0 | 4.6 | Yes |
| 16 | 56.7 | 9.4 | 3.8 | Yes |
| 17 | 57.0 | 10.1 | 3.2 | Yes |
| 18 | 59.9 | 5.7 | 3.5 | Yes |
| 19 | 60.5 | 4.3 | 3.0 | Yes |
| 20 | 60.6 | 4.4 | 3.4 | Yes |

Texture analysis measurements were obtained for extruded pieces from each sample. Extruded pieces from each sample individually placed on the stage of a TA.HDPlus Texture Analyzer (Texture Technologies, Massachusetts, USA) and subjected to a 50% strain test at a speed of 2 mm/second using a 50 kg load cell and a 1 inch cylindrical stainless steel probe The average 50% strain force of 10 replicates determined that acceptable extruded pieces identified in Table 1 had texture analysis measurements from about 400 g to about 6600 g force, with texture analysis measurements greater than about 1000 g force being more preferred. Texture analysis measurements taken for a variety of commercially available textured vegetable protein (TVP) products, sold as meat analog, substitute, or imitation, ranged from about 7400 g to about 9000 g force, while a variety of commercially available soy crisps ranged from about 1300 g to about 1400 g force. Many available TVP products are considered to be too hard to be enjoyable to eat without soaking in a liquid first.

Particle density measurements were obtained for extruded pieces from each sample. Extruded pieces from each sample were analyzed for density by the displacement of granular sodium chloride. Briefly, about 150 cc of sodium chloride was placed in a 250 ml graduated cylinder and tapped in a tap density analyzer 300×. The volume of salt was recorded to the nearest cc. The salt was then removed from the cylinder. The salt was poured back into the cylinder in about 10-20 cc aliquots alternating with pieces of a known weight of sample until the volume was approximately 150 cc. The remaining salt was then placed in the cylinder. The cylinder was again tapped 300× in the tap density analyzer. The volume was recorded and the particle density of each sample was calculated as the weight of the sample divided by the difference in tapped volume with and without sample present. The average particle density for acceptable extruded pieces (see, Table 1) ranged from about 0.7 g/cc to about 1.0 g/cc, with densities from about 0.8 g/cc to about 0.9 g/cc being more preferred. Densities of a variety of TVP products ranged from about 0.7 g/cc to about 0.8 g/cc, while commercially available soy crisps ranged from about 0.4 g/cc to about 0.5 g/cc. Thus, while acceptable extruded pieces had a similar density to commercially available TVP products, texture was somewhat reduced to result in a product that provides a better eating experience than a TVP product without prior hydration.

Macroscopic and microscopic images of Sample 16 (Table 1), Sample 5, which contains no added oil (Table 1), two commercially available TVP products, and two commercially available protein (soy) crisps were taken to examine the structure of each sample. The surface of extruded pieces were imaged using an Epson® V700 (Epson America Inc., California, USA) photographic scanner. Pieces were also sectioned using a razor blade and the interior of pieces were also imaged using an Epson V700 photographic scanner. FIG. 1 shows macroscopic images of the surfaces of representative pieces of each sample, while FIG. 2 shows macroscopic images of the interiors of representative pieces of each sample, with 1A and 2A being Sample 16, 1B and 2B being Sample 5, 1C and 2C being a first TVP product, 1D and 2D being a second TVP product, 1E and 2E being a first protein crisp, and 1F and 2F being a second protein crisp.

Figure 3E:
Figure 3F:

Extruded pieces were prepared for transmitted light microscopy by hydrating pieces from each sample in a refrigerated 50:50 mixture of Tissue-Tek® O.C.T.™ (Sakura Finetek Europe B.V., The Netherlands) and water until the center was hydrated. Once rehydrated, pieces were frozen and then cut into 20 micron sections using a cryostatic microtome. The sections were stained using 0.1% Ponceau 2R, which stains protein red, and an aqueous iodine solution, which stains starch blue. The sections were imaged using an Olympus® AX70 Microscope light microscope with a 20× objective and Olympus® DP70 digital camera with a 10× eyepiece (Olympus America Inc., Pennsylvania, USA). FIG. 3 compares light micrographs of an example of an extruded piece (Sample 16 from Table 1; FIG. 3A), a piece containing no oil (Sample 5 from Table 1; FIG. 3B), two commercially available TVP products (FIGS. 3C and 3D), and two commercially available soy crisps (FIGS. 3E and 3F). Sample 16 (FIG. 3A) had relatively large agglomerations of non-linearly oriented protein surrounded by protein matrix disruptive ingredient (starch in this example) in a loosely packed structure. This contrasts to Sample 5 (FIG. 3B), which had linearly-oriented protein with protein matrix disruptive ingredient dispersed in spaces between protein strands. Commercially available TVP products (FIGS. 3C and 3D) appeared similar in structure to Sample 5, with linearly oriented protein. Without being bound to theory, it is believed that the similar, linearly oriented protein structure of the commercially available TVP products to Sample 5 is, in part, due to absence of any significant amount of oil during extrusion. Commercially available soy crisps (FIGS. 3E and 3F) showed agglomerations of protein that are smaller and more tightly packed compared to Sample 16 (FIG. 3A).

Extruded pieces were prepared for confocal microscopy by cross-sectioning representative pieces from each sample with a razor blade. Autofluorescence of at the cut surface was imaged using an Olympus Fluoview 1000 confocal microscope with a 4× objective and 425-475 nm, 500-530 nm, and 560-660 nm emission filters after excitation at 405 nm, 488 nm, and 568 nm lasers, respectively. The images in FIG. 4 are z-stacks of 10 micron optical sections, with imaged stacks from each laser overlaid. It was observed that the TVP samples autofluoresced under the 568 nm laser, but the other samples did not. Thus, images for the TVP samples (4C and 4D) include overlays of images obtained using excitation at 405 nm, 488 nm, and 568 nm, while images for Sample 16 (4A), Sample 5 (4B), and commercially available protein crisps (4E and 4F) include overlays of images obtained using excitation at 405 nm and 488 nm.

Example 2

Extruded pieces including a protein matrix disruptive ingredient comprising insoluble fiber (e.g., oat hull fiber), were produced. Formulations including soy protein isolate (SPI), flour (F), insoluble fiber (IF), sugar (S), oil (O), water (W), and flavor (R) according to Table 3 (SPI, F, IF, S, and R are shown as % weight of dry ingredients and O and W are shown as % weight of protein matrix composition) were combined to form a protein matrix composition, formed, and dried similarly to Example 1.

TABLE 3

| Sample | SPI | F | IF | S | R | W | O | SME (Wh/kg) | Die temp. (° F.) | Die press. (PSI) |
|---|---|---|---|---|---|---|---|---|---|---|
| 1 | 55.4 | 20.0 | 20.0 | 4.0 | 0.6 | 43.0 | 4.7 | 29.8 | 274 | 300 |
| 2 | 55.4 | 20.0 | 20.0 | 4.0 | 0.6 | 40.9 | 8.9 | 23.0 | 270 | 242 |
| 3 | 55.4 | 20.0 | 20.0 | 4.0 | 0.6 | 48.9 | 7.8 | 16.1 | 261 | 194 |
| 4 | 45.4 | 20.0 | 30.0 | 4.0 | 0.6 | 48.6 | 7.8 | 17.3 | 256 | 201 |
| 5 | 45.4 | 20.0 | 30.0 | 4.0 | 0.6 | 36.4 | 9.7 | 31.4 | 271 | 291 |
| 6 | 45.4 | 20.0 | 30.0 | 4.0 | 0.6 | 36.4 | 9.7 | 29.9 | 273 | 287 |
| 7 | 35.4 | 20.0 | 40.0 | 4.0 | 0.6 | 34.2 | 10.0 | 34.8 | 280 | 313 |

Extruded pieces surprisingly incorporated the insoluble fiber without compromising the texture or flavor of the pieces. Extruded pieces including relatively high amounts of fiber could be used in various food products to increase protein and/or fiber content while providing an enjoyable eating experience.

Example 3

Extruded pieces having almond inclusions were produced. Formulations including soy protein isolate (SPI), flour (F), inclusions (I), sugar (S), oil (O), water (W), and flavor (R) according to Table 4 (SPI, F, I, S, and R are shown as % weight of dry ingredients and O and W are shown as % weight of protein matrix composition) were combined to form a protein matrix composition, formed, and dried similarly to Example 1. It is noted that the amount of oil includes the amount contributed by both the almond inclusions and added oil.

TABLE 4

| Sample | SPI | F | S | R | I | W | O | SME (Wh/kg) | Die temp. (° F.) | Die press. (PSI) |
|---|---|---|---|---|---|---|---|---|---|---|
| 1 | 65.4 | 30.0 | 4.0 | 0.6 | 12.3 | 31.5 | 12.0 | 27.9 | 273 | 348 |
| 2 | 65.4 | 30.0 | 4.0 | 0.6 | 11.6 | 35.5 | 11.3 | 26.5 | 266 | 325 |
| 3 | 65.4 | 30.0 | 4.0 | 0.6 | 10.8 | 39.9 | 10.5 | 23.8 | 261 | 287 |

Extruded pieces had an acceptable texture and macroscopically identifiable almond pieces.

Figure 5:
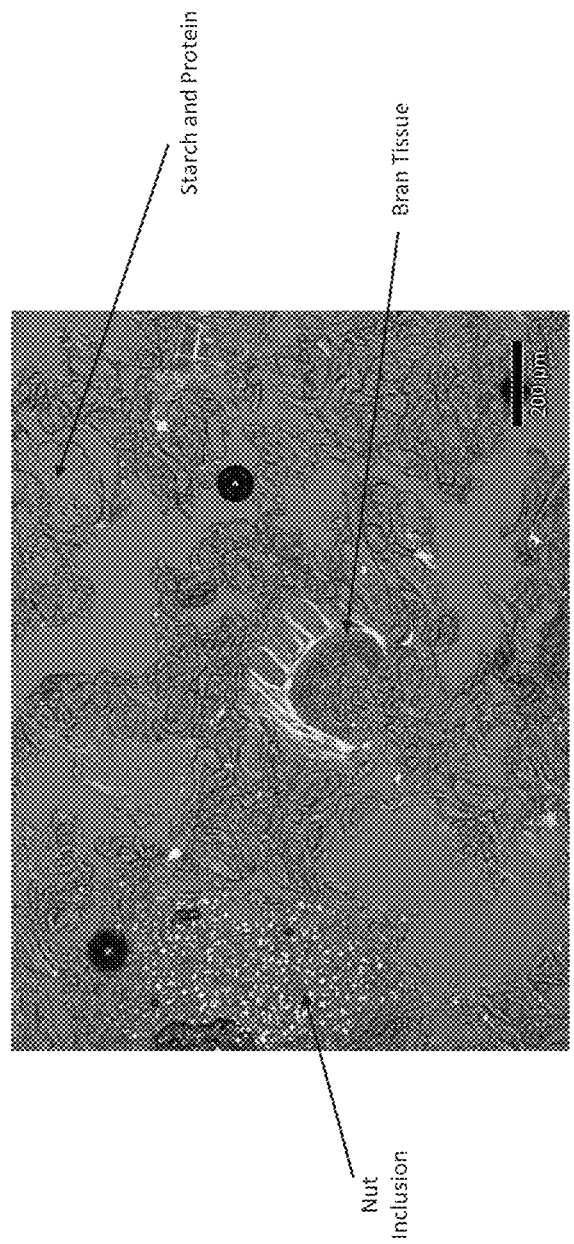
FIG. 5 is a polarized light micrograph of an extruded piece having inclusions according to another embodiment.

Samples were prepared for polarized light microscopy using the same hydration procedure and equipment as for the light microscopy in Example 1, except the microscope was equipped with polarizing filters and first order red plate, and a 10× objective with a 10× eyepiece. As shown in FIG. 5, polarized light microscopy showed relatively large agglomerations of non-linearly oriented protein surrounded by protein matrix disruptive ingredient in a loosely packed structure similar to Sample 16 in Example 1. In addition, nut inclusions and bran are identifiable, as shown in FIG. 5.

Example 4

Additional extruded pieces were produced that included a powdered protein ingredient comprising a combination of soy protein isolate and whey protein using a protocol similar to Example 1. The extruded pieces had an acceptable texture, but were slightly cripsier than the acceptable samples in Example 1. Extruded pieces comprising whey protein can be used to produce food products where a crispier texture is desired.

Additional samples were also produced using a protocol similar to Example 1 and included a protein matrix disruptive ingredient that comprised apple powder (10% by weight dry ingredients), cinnamon (1.5-2% by weight dry ingredients), or cocoa powder (1.5-2% by weight dry ingredients). The extruded pieces were determined to have an acceptable texture. The samples that included apple flakes had a light color and an apple flavor. The samples that included cocoa were brown in color. Oat flour and rice flour were also tested as protein matrix disruptive ingredients, and both produced acceptable extruded pieces.

Additional inclusions were also tested, including dried cranberry pieces, rolled oats, whole sweet corn, coconut, flax seed, and Chia seed. All of the tested inclusions resulted in extruded pieces with macroscopically visible inclusions.

The implementations described above and other implementations are within the scope of the following claims. One skilled in the art will appreciate that the present disclosure can be practiced with embodiments other than those disclosed. The disclosed embodiments are presented for purposes of illustration and not limitation.

The invention claimed is:

1. A method of making ready to eat extruded pieces, comprising:
   a. processing, under extrusion conditions, a composition comprising a powdered protein ingredient, a protein matrix disruptive ingredient, water, an oil, and inclusions, with the powdered protein ingredient comprising at least 45% protein by weight of the powdered protein ingredient, to form a protein matrix composition having a protein content of from about 10% to about 65% by weight, a moisture content of from about 25% to about 55% by weight, an oil content of from about 1% to about 15% by weight, and inclusions in an amount of about 10% to about 50% by weight, wherein the extrusion conditions comprise a specific mechanical energy (SME) of from about 10 Wh/kg to about 50 Wh/kg, a die pressure of from about 150 PSI to about 350 PSI, and/or a die temperature of from about 200° F. to about 350° F.;
   b. forming the protein matrix composition into pieces, and
   c. drying the protein matrix composition pieces to a moisture content of from about 1.5% to about 8% by weight to form ready to eat extruded pieces having visually distinguishable inclusions, a density of from about 0.8 g/cc to about 1.0 g/cc, a texture suitable for consumption without further preparation, and agglomerations of protein surrounded by protein matrix disruptive ingredient, the protein being in an amount of about 30% to about 90% by weight of the extruded pieces, a protein matrix disruptive ingredient in an amount of from about 5% to about 50% by weight of the extruded pieces, oil in an amount of from about 4% to about 20% by weight of the extruded pieces, the oil substantially uniformly distributed throughout the extruded pieces.

2. The method of claim 1, wherein the powdered protein ingredient comprises at least a portion of the protein matrix disruptive ingredient.

3. The method of claim 1, wherein the protein matrix disruptive ingredient comprises a flour or a syrup.

4. The method of claim 1, wherein the protein matrix disruptive ingredient comprises a starch, a sugar, or a fiber.

5. The method of claim 1, wherein the extruded pieces have a texture analysis measurement of from about 1000 g to about 7400 g force.

6. The method of claim 1, further comprising applying a sugar-based or protein-based coating to the extruded pieces to form coated pieces and drying the coated pieces.

7. The method of claim 1, further comprising applying a fat-based coating to the extruded pieces to form coated pieces and cooling the coated pieces.

8. The method of claim 1, wherein the inclusions comprise nuts, seeds, fruit, grains, or coconut.

9. Ready to eat extruded pieces made by the method of claim 1.

10. The method of claim 1, wherein the extrusion conditions include a die pressure of from about 150 PSI to about 350 PSI.

11. The method of claim 1, wherein the extrusion conditions include a specific mechanical energy (SME) of from about 10 Wh/kg to about 50 Wh/kg.

12. The method of claim 1 wherein the extrusion conditions include a die temperature of from about 200° F. to about 350° F.

13. The method of claim 10, wherein the extrusion conditions further include a specific mechanical energy (SME) of from about 10 Wh/kg to about 50 Wh/kg and a die temperature of from about 200° F. to about 350° F.

14. The method of claim 1, wherein the extrusion conditions include a die pressure of from about 150 PSI to 350 PSI.

15. The method of claim 1, wherein the extruded pieces have a substantially non-linearly oriented protein matrix.

* * * * *